INVENTORS
JAMES K. GRUNIG
WILLIAM B. DAVIS
WILLIAM C. AITKENHEAD

BY

ATTORNEYS

INVENTORS
JAMES K. GRUNIG
WILLIAM B. DAVIS
WILLIAM C. AITKENHEAD
BY
ATTORNEYS

United States Patent Office 3,685,961
Patented Aug. 22, 1972

3,685,961
EXTRACTION OF BERYLLIUM FROM ORES
James K. Grunig and William B. Davis, Tucson, Ariz., and William C. Aitenhead, Belize City, British Honduras, assignors to The Anaconda Company, New York, N.Y.
Continuation-in-part of application Ser. No. 710,984, Mar. 3, 1968, which is a continuation-in-part of application Ser. No. 316,474, Oct. 15, 1963, now Patent No. 3,395,975. This application Dec. 21, 1970, Ser. No. 99,753
Int. Cl. C22b 59/00
U.S. Cl. 423—127  2 Claims

ABSTRACT OF THE DISCLOSURE

The extraction and the recovery of beryllium substantially devoid of zinc and other impurities from low and medium grade acid-leachable beryllium bearing ores is accomplished by acid leaching at a pH in the range from 1.2 to 2, preferably between 1.3 and 1.5, and advantageously with the aid of a soluble fluoride additive, followed by raising the pH of the leach liquor in two successive steps, initially to below about 4.5 and finally to below 9.0, to precipitate beryllium hydroxide relatively free from impurities. In the initial pH raising step, aluminum is precipitated from the leach solution. The precipitated beryllium hydroxide is further purified by redissolution and hydrolysis in sodium hydroxide solution. Zinc is removed from the final beryllium product by treating the sodium hydroxide solution with a soluble sulfide before the hydrolysis of the redissolved beryllium hydroxide.

CROSS-REFERENCE TO A RELATED APPLICATION

This is a continuation-in-part application of our application Ser. No. 710,984, filed Mar. 6, 1968, which in turn is a continuation-in-part of our application Ser. No. 316,-474, filed Oct. 15, 1963, entitled "Precipitation of Beryllium from Ore," now Pat. No. 3,395,975.

BACKGROUND OF THE INVENTION

(I) Field of the invention

This invention relates to a process for the extraction and recovery of beryllium in the form of substantially pure beryllium compounds from beryllium bearing ores. More particularly, this invention relates to a process for the extraction of acid-leachable beryllium values from ores in a manner permitting easy separation of those values from other mineral components in the ores. The process of this invention is particularly suitable for recovering beryllium values from low and intermediate grade ores.

(II) Description of the prior art

Several processes for the extraction of beryllium values from ores have been developed, some of which are only suitable for acid-leachable beryllium values. In these prior art processes, it has been difficult to separate compounds of aluminum, iron, magnesium, and calcium from the beryllium compound component. Hence, the final beryllium product is rather impure. It has, heretofore, been proposed to extract beryllium compounds from beryllium bearing ores by leaching with acid, and then cauticizing the leach liquor and autoclaving it at high temperature and pressure for the elimination of impurities such as aluminum, iron and calcium from the beryllium bearing solution. While such prior method is economically attractive for the high yield production of substantially pure beryllium hydroxide, for a commercial scale operation it becomes necessary to provide a large autoclave capacity to handle the large volume of leach liquor. The cost for the construction of the autoclaves, therefore, requires a large capital expenditure.

SUMMARY OF THE INVENTION

In the process of the present invention, beryllium bearing material containing aluminum, iron, fluorine, and other impurities is leached with a mineral acid at a pH in the range from 1.2 to 2.0, to extract the beryllium and a minimum of impurities from the material. The acid slurry then is heated and its pH carefully raised to above 3.0 but below about 4.5, and preferably below 4.0, to cause the precipitation of fluoro-compounds of aluminum and compounds of iron. The precipitates are separated from the leach liquor by filtration and the pH of the filtrate is then further raised to above 7.5 but below 9.0 causing the precipitation of beryllium from the solution. A minor amount of impurities are also concurrently precipitated. In accordance with this invention, the beryllium precipitate is recovered and digested in a sodium hydroxide solution. The beryllium in the sodium hydroxide solution is treated with a soluble sulfide, preferably sodium sulfide, to precipitate zinc and any other heavy metal impurities still present, and the precipitate is recovered by filtration. The filtrate is then hydrolyzed and reprecipitated as beryllium hydroxide thus precipitating values rich in beryllium hydroxide thus precipitating values rich in beryllium.

DESCRIPTION OF THE PREFERRED EMBODIMENT

Figure 1:
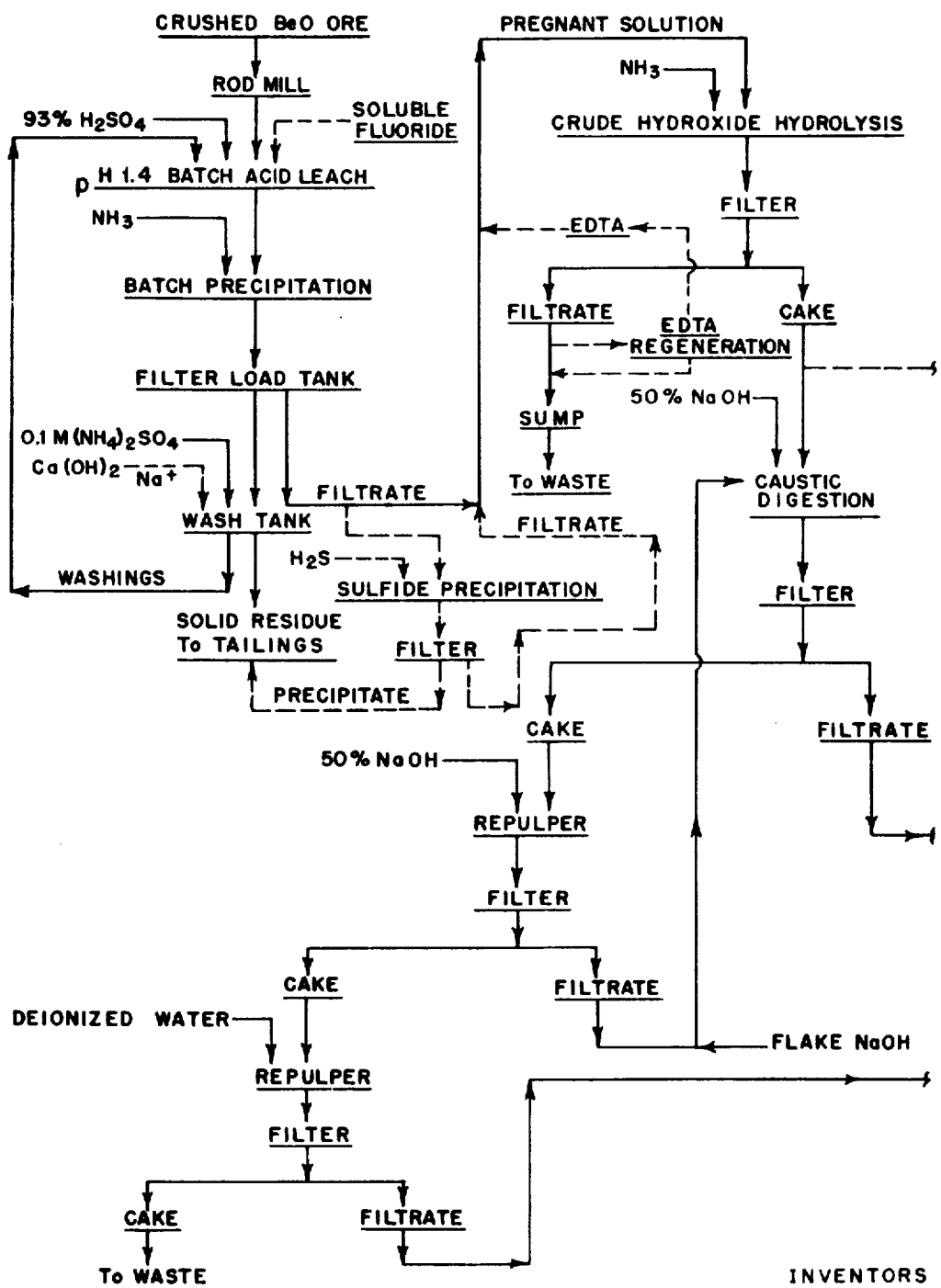
FIGS. 1 and 2, taken together, are a flowsheet of a specific procedure and its alternatives for producing substantially pure Be(OH)$_2$.
Figure 2:
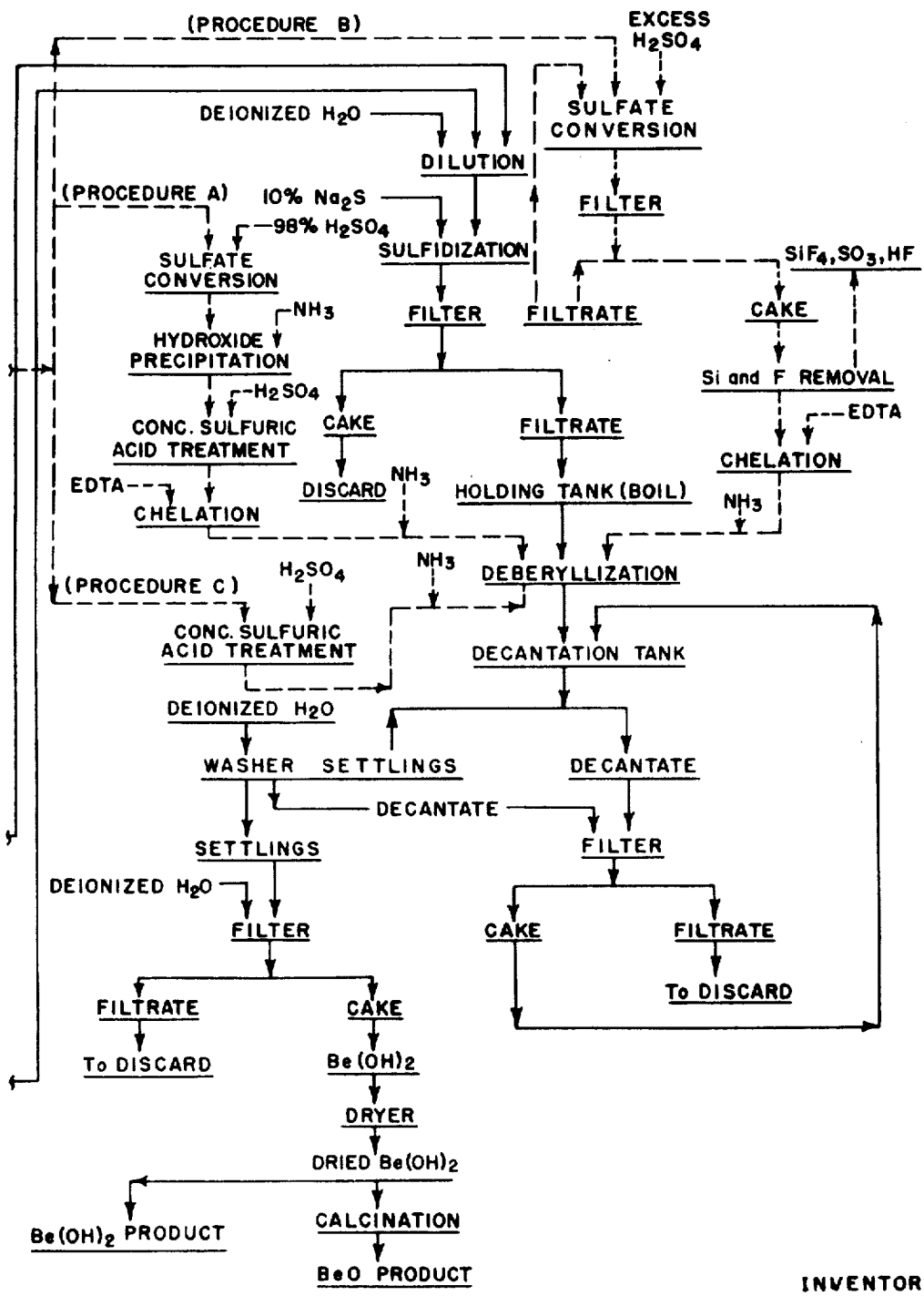

A number beryllium ores are suitable for treatment by the method of the present invention, such as Spor Mountain and Topaz Mountain ores. The beryllium Spor-Topaz ores is thought to be contained in the mineral bertrandite, Be$_4$Si$_2$O$_7$(OH), and in beryliferous saponite, a clay-like mineral, both of which are soluble in moderate concentrations of mineral acid. In contrast to bertrandite, beryl (3BeO·Al$_2$O$_3$·6SiO$_2$) and phenacite (Be$_2$SiO$_4$), other forms of naturally occurring beryllium, are not readily soluble in moderate acid concentrations, but may be rendered acid soluble by prior art processes including fluoride sintering or alkali fusion. Spor-Topaz ores are thus susceptible to leaching directly by mineral acid and may therefore be advantageously used in the process of this invention. Other ores containing beryllium values, when rendered acid-soluble by prior art methods, may also be used in the process herein.

Following is a detailed description of a beryllium recovery operation embodying the invention, presented with reference to the accompanying two sheets of drawings which together show a single flowsheet of a specific procedure and its alternatives for producing substantially pure Be(OH)$_2$. The dotted line shows the alternative procedures.

Referring to the drawing, the beryllium ore (after it is ground to the desired size) is acid-leached with sulfuric acid. Instead of sulfuric acid, hydrochloric acid may be used although sulfuric acid is preferable because of lower costs. Spor-Topaz ores may be leached with conventional acid leach liquids having a pH substantially below 1.0, but in accordance with the invention, the ore is leached preferably with H$_2$SO$_4$, the pH of the leach solution being maintained above about 1.2 and below about 2.0 throughout the duration of the leaching operation. The temperature of the leach solution is in the range from about 160° F. to just below the boiling point of the leach liquor, and the leaching operation proceeds for a period sufficient to dissolve substantially all the beryllium values in the material. Leaching may be at a temperature higher than boiling, in which case pressurized equipment is used. In the process the pH of the acid solution is maintained above about 1.3 during one or more major portions of the leaching period, e.g., for periods of two to three hours at a time, so that the amount of impurities which leach from the ore and enter the leach solution, such as aluminum, iron and fluorine, are kept at a desirably low and controlled level. The pregnant acid solution then may be recovered for further treatment to extract high purity beryllium therefrom.

Preferably, the leaching operation is carried out in a controlled manner so that the pH values are maintained throughout its duration in the range from about 1.3 to about 1.5. When the leaching is conducted at a pH of about 1.4, it requires, typically, using about 450 pounds of $H_2SO_4$ per ton of ore. This amount of acid-leach solution used should be sufficient to result in a slurry containing from about 25% to about 33% of solids.

The time required to leach the ores may vary within a wide range depending on leaching conditions which include the pH, the leaching temperature, and the solids concentration. We have found that the amount of available fluoride in the leach solution has a direct bearing on the rate of leaching. Leaching Spor-Topaz ores using an acid-leaching solution at the preferred pH of about 1.4 and at a temperature in the range between 160° F. and 200° F., and with a slurry containing about 25% solids by weight, a period of about 20 hours is normally required for the leaching operation. This period, however, can be drastically reduced if the available fluoride content in the leach solution is raised by the addition of a soluble fluoride. By providing as little as 0.3 g./l. of excess fluoride in the liquor, the leaching time may be reduced to about 6 hours.

The exact reason for the dramatic improvement in the leaching time is not yet certain. It may be due to the fact that, in leaching, beryllium goes into the solution as a fluoro-complex, and, therefore, the rate of leaching is dependent on the fluoride ion activity. If a fluoride is made available only through the following reaction:

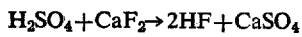

$$H_2SO_4 + CaF_2 \rightarrow 2HF + CaSO_4$$

then the diffusion rate of $H_2SO_4$ and HF through the $CaSO_4$ layer on the fluoride is an inherent limitation of the leach rate. The addition of a soluble fluoride, such as NaF, releases hydrogen fluoride which in combination with sulfuric acid allows the beryllium dissolution to take place at a faster rate.

Any soluble fluoride which can be readily dissolved in the acid leach solution and which does not materially contribute to the impurities in the final BeO product may be used. Among them, NaF, $NH_4F$, $NaHF_2$, $NH_4HF_2$, HF and $AlF_3$ are eminently suitable. The amount of soluble fluoride that can be added to the solution is not especially critical and depends to a large extent on the amount of available fluoride in the leach liquor. In general, even a trace amount provides beneficial results. Usually an addition above 3 g./l., preferably in the range of 3 to 5 g./l., of the leach liquor based on the weight of the fluorine seems to be effective for reducing the leaching time to the suitable short duration.

The upper limit as to the amount of fluoride that can be added is not critical. An amount far above that required for the combination with the beryllium values usually is not required. Spor-Topaz ores, the fluoride addition required to combine with the beryllium values therein seldom exceeds 10 g./l. of the leach liquor based on the weight of the fluorine.

The fluoride may be added directly into the ore prior to the addition thereto of the acid leach solution, or it may be added directly to the leach solution. Preferably, the fluoride addition is made soon after the major acid addition to form the resultant slurry. The time at which the fluoride may be added to the leach liquor, however, is not very critical as long as its addition provides free fluoride ions for the formation of beryllium fluoro-complexes.

In addition to the aforesaid soluble alkali fluorides, certain soluble aluminum salts, particularly $AlF_3$, may be used as additives to facilitate the leaching operation. $AlF_3$ when added into the acid leach liquor forms $AlF^{++}$ and $AlF_2^+$ ions, the presence of which decrease the solubility of aluminum and have the added benefit of supplying the fluoride ions required for the leaching. The lowering of the aluminum solubility is due to the offset of the equilibrium conditions within the leach liquor wherein both the beryllium and the aluminum compete for the fluoride ions to form the soluble fluoro-complexes.

The preferred leaching method of this invention as described is superior to the conventional leaching methods which use more strongly acid leach solutions having pH's substantially below 1.2 (typically about 1000 pounds of acid per ton of ore). The lower concentration of acid in the leach solution also provides savings of alkali required in the subsequent pH raising step of the process and has the additional advantage of maximizing the extraction of beryllium values while minimizing the solubilization of other mineral impurities which would otherwise be soluble in a more concentrated acidic solution.

The slurry at this point can be filtered or it may be further processed without filtering. (The filtering step is not shown in the accompanying flowsheet). Filtering and washing at this stage are generally more rapid and have the advantage of requiring less alkali in a subsequent partial neutralization step. If filtration is used, the residue is treated with a series of displacement and re-pulp washes using hot leaching solution. The residue washings are used advantageously as make-up solutions for the subsequent leaching operation. With or without filtering, the leach solution recovered from the ore contains in solution substantially all the beryllium of the ore (approximately 95%) together with a substantial amount of impurities leached from the ore (but, as indicated above, a notably lower concentration of impurities than would be present in a conventional high-acid leach solution).

A typical leach liquor at this stage contains about substantially the following (in g./l.):

```
BeO _____ 2.3
Al₂O₃ _____ 6.5
Fe _____ .42
MgO _____ 7.2
Mn _____ .02
Zn _____ .16
F _____ 6.4
```

The impurities in the leach liquor are sufficiently low for it to be suitable for further treatment using the two successive pH raising operations to recover substantially pure beryllium therefrom. This part of the process comprises raising the pH of a leach solution containing beryllium together with aluminum, iron, fluorine, and other impurities to above 3.0 but below about 4.5, and preferably above 3.8 and below 4.2, to cause the precipitation of fluoro-compounds of aluminum and compounds of iron. The precipitates are separated from the leach liquor by filtration and the pH of the filtrate is then further raised to above 7.5 but below 9.0 causing the precipitation of beryllium hydroxide from the solution.

For the initial pH raising operation, a base chosen from $NH_3$, $NH_4OH$, NaOH, KOH, milk of lime or equivalent carbonates or oxides, and organic bases such as urea, is introduced gradually into the heated acid leach solution until its pH has been uniformly raised to a value below about 4.5 but above 3.0, preferably in the range from about 3.8 to about 4.2. (The pH used here in inversely temperature dependent.) At this pH, almost all the iron is precipitated as a basic ferric salt and a substantial portion of the aluminum is precipitated as a hydroxyfluoride.

The stability of aluminum hydroxyfluoride is dependent on the temperature and the pH of the leach solution. Apparently, the higher the temperature, the more stable is the aluminum hydroxyfluoride over a wider pH range. Thus, in our prior process, the removal of the aluminum and fluoride impurities in the leach solution required autoclaving the leach solution at a temperature in the range between 300° and 600° F. At lower temperatures, e.g., below 212° F., as now contemplated, the precipitation of the aluminum hydroxyfluoride, unless carefully controlled in accordance with the invention, tends to be incomplete and takes longer. We found that a higher pH is required if a sufficient amount of aluminum is to be recovered, in other words, to be removed from the leach solution. However, the pH of the solution should not be so high as to cause undesirable co-precipitation of beryllium.

Using lower temperatures, the precipitation of aluminum hydroxyfluoride is further complicated by the competing activities of fluoride and hydrogen ions. It has been found that higher fluoride activity tends to promote precipitation. In leach solutions with a pH in the range of 1.0 to 4.5, the fluoride activity is inversely proportional to the activity of the hydrogen ions. Increasing the activity of the fluoride ions accompanies an increase in pH and in the activity of hydroxy ion which tends to promote precipitation of beryllium. We found that below this pH range, the amount of aluminum hydroxyfluoride precipitation is very small unless the temperature of the solution is greatly increased as to require autoclaving, and above this range undesirable co-precipitation of beryllium is observed.

It is important to note that precipitation according to the present invention is not to be confused with the prior art fractional hydrolysis for the removal of aluminum in acid leach solution which will not work in the present case because of the presence of fluoride ions in the leach solution.

The leach solution, after 4 or 5 hours of hot (180° F. or greater) precipitation at a pH of about 4, is filtered clear to eliminate all residual and precipitated impurities. A typical clear leach solution contains substantially the following (in g./l.):

| | |
|---|---|
| BeO | 1.6 |
| $Al_2O_3$ | 1.4 |
| Fe | 0.04 |
| MgO | 2.6 |
| Mn | 0.16 |
| Zn | 0.10 |
| F | 1.8 |

The filter cake is washed and then discarded. It has been found that if the ore residue is not filtered from the leach solution prior to adjusting the pH to near 4, more of the dissolved beryllium appears to be absorbed by the clayey material in the filter cake than if the filtration were made. In such instances, complete washing is difficult. By cationic displacement using such chemicals as sulfuric acid and/or ammonium sulfate in the wash water, the absorbed beryllium can be more easily washed from the clay. A considerable amount of wash water may be employed since the washing can be used in making up the next batch of acid leach solution.

If milk of lime ($Ca(OH)_2$) is used to raise the pH initially to above 3.0 but below 4.5 and in the presence of $Na^+$, aluminum will precipitate not only as hydroxyfluoride of the formula $$16Al(OH,F) \cdot 6H_2O$$

but also coprecipitate with sodium, magnesium and fluorine in the form of the mineral ralstonite of the following formula $$Na_{(2-x)}(Al, Mg)_2(F, OH)_6 \cdot (1-y)H_2O$$

wherein $x = Al \simeq 1.6$ and $y \simeq 0.1$.

The optimal conditions for precipitation with milk of lime in the presence of $Na^+$ vary with the process variables. We found precipitation of impurities at a pH of about 4.0 and at a temperature about 200° F. to be eminently suitable. The retention time at this temperature is about 6 hours. The retention can be reduced at a higher temperature. A typical clear leach solution contains substantially the following (in g./l.):

| | |
|---|---|
| BeO | 3.0 |
| $Al_2O_3$ | 0.5 |
| Fe | 0.1 |
| MgO | 1.5 |
| Mn | 0.2 |
| CaO | 1.0 |

Using milk of lime for the pH raising together with $Na^+$, it is possible to obtain $BeO/Al_2O_3$ ratio in the range between 5 to 10 as compared to the ratio of 1 to 3 for the pH raising operation wherein aluminum is precipitated only as hydroxy-fluoride.

The sodium in the leach solution required for the ralstonite precipitation may be provided by the soluble sodium fluoride used for facilitating the leaching operation. It may also be provided by adding to the filtered leach solution a sodium salt which will not interfere with the formation of the ralstonite or with the subsequent recovery of beryllium values. Sodium sulfate or sodium fluoride (the latter may be used for the leaching) are found to be eminently suitable.

After the precipitation, the leach solution is filtered and the filter cake may be treated in the same manner as described for the hydroxyfluoride precipitation.

Subsequent to the removal of the ore residue, ammonia or another suitable base is again used to raise the pH of the clarified filtrate to a higher pH between 7.5 and 9.0 and preferably in the range of 8.0 to 8.5. At this pH range, beryllium in the form of beryllium hydroxide is precipitated. Co-precipitated with the beryllium is the residual aluminum and some magnesium. The exact composition of these precipitates, however, is obscure. The precipitates preferably are recovered by filtration. The filtrate, which contains the important amounts of the Zn, Mg, Ca, Cu, Mn and other impurities originally present, is discarded. A typical dried precipitate recovered from this filtration has substantially the following composition (percent):

| | |
|---|---|
| BeO | 22.0 |
| $Al_2O_3$ | 5.60 |
| Fe | 0.06 |
| MgO | 17.16 |
| Mn | 0.08 |
| Zn | 0.06 |
| F | 24.1 |

In the second pH raising step, a number of alkalies (e.g., sodium or potassium hydroxide, or even lime or calcium carbonate) may be used, of which ammonia, however, is preferred because of its low cost and its ability to complex with a number of metal ions, particularly zinc, to form soluble complexes. The beryllium precipitation may be carried out at a temperature above about 160° F. but preferably below the boiling point of the solution.

Heavy metal ions particularly $Zn^{++}$ remaining in the leach solution after the initial pH raising step and subsequent filtration may be removed prior to the second pH raising step using soluble sulfide to precipitate the heavy metal ions as sulfides as shown by the dotted line in the accompanying flow sheet. The sulfide precipitation step removes substantially all zinc ions in the solution (solutions containing 50 parts per million zinc before treatment with a soluble sulfide treatment typically containing less than 1 part per million afterwards) as well as other heavy metal ions such as copper, cadmium, and lead.

For many applications, the zinc level of BeO is preferably less than 1000 p.p.m. which corresponds to a zinc concentration less than 0.001 gm./liter in the pregnant solution after initial precipitation at a pH of about 4.0. At this low level of zinc concentration, and at the pH range between 3.5 to 4.0, the removal of the zinc ion by the addition of the sulfide ion (desirably but not exclusively $H_2S$) is readily controlled by measuring the electromotive force (EMF) of the solution. For example, we found a gold electrode with a silver-silver chloride reference can be used to monitor the change in EMF. When the gold electrode and its reference are tested in a ferrocyanide-ferriccyanide standard solution, an EMF of 172 millivolts is obtained, and using a platinum electrode and a hydrogen reference, the EMF is 428 millivolts. We found that the zinc precipitation is substantially completed when the EMF between the gold electrode and the silver-silver chloride reference electrode is —250 millivolts. Of course, it is understood that the EMF would be different if a different pair of electrodes were used. In such cases, the difference between the new EMF and —250 millivolts would equal the difference between the reading of the new electrode pair in the standard solution and 172 millivolts.

A preferred procedure for zinc and other heavy metals removal from the pregnant pH 4.0 solution is to heat the solution in the sulfidization tank to about 140° F. and thereafter to introduce the gaseous $H_2S$ into the solution until the EMF of the gold and silver-silver chloride electrodes reaches —250 millivolts and is maintained at that level for one-half hour. The level of zinc in the solution can be checked in a conventional manner such as with dithizone. When the zinc level is within the requirement (below 0.001 gram/liter), the solution is filtered and thereafter the filtrate is tested again with dithizone to assure the zinc level therein is less than 0.001 gm./liter. If the zinc level is above the required level, additional sulfide is used to bring the level down to requirement. Additional filtering is used to remove the precipitates therein.

After the removal of the heavy metal ions and prior to the second pH raising step, a chelating agent, preferably ethylene diamine tetraacetic acid (EDTA), may be used to complex with the filtrate (pregnant solution) from the sulfide precipitation tank as shown by the dotted line in the accompanying flow sheet. It is important that the chelating agent is added after the sulfide precipitation since most of the heavy metal ions removed in the earlier treatment chelates with EDTA to form stable soluble chelates which cannot be readily broken up in the subsequent regeneration step for the recovery of EDTA. The sulfide precipitation reduces the concentration of cations which chelate with EDTA to form stable complexes. Normally, after sulfide treatment, the pregnant solution contains only a low concentration of $Mn^{+++}$ and $Fe^{+++}$ cations whose chelates cannot be broken up. We have found that of the impurities present only fluorine, sodium, and silica do not chelate with EDTA. Advantageously, EDTA is first dissolved in a pH 5.5 solution prior to its addition to the pH 4.0 pregnant solution. An excess amount of EDTA is used to insure complete complexing of all chelatable cations therein to form the soluble complexes. A retention time of several hours (2 to 10 hours) at the temperature range of 1000° to 160° F. is preferably used to allow the slow chelating cations such as $Al^{+++}$ and $Fe^{+++}$ to form the complexes.

Following chelation, the pH of the solution is raised to the desired pH range above 7.5 but below about 9.0 in the manner described. It is noted that the presence of the fluorine ions has retained the beryllium values in the solution until the higher pH values are reached at which time the beryllium is precipitated as hydroxide.

After the beryllium hydroxide precipitate is recovered by filtration, the filtrate containing the EDTA complexes is treated to regenerate EDTA for recycling. The filtrate generally contains the EDTA complexes of Ca, Mg, Al, Mn, and Fe and some free EDTA. The alkaline earth and alkali metal complexes are regenerated easily by acidifying the filtrate to a pH of about 1.8. The aluminum chelate can be regenerated by lowering the pH to about 1.4. The complexes of $Mn^{+++}$ and $Fe^{+++}$ which cannot be regenerated are not recovered, the amount of which, however, is small compared to the total amount of EDTA recovered. The regenerated as well as the excess EDTA is precipitated from the acidified solution and is recovered by filtration.

The successive pH raising steps remove a major amount of impurities from the original leach solution. The beryllium filter cake may be further treated by conventional mbethods for removing the impurities. Further purification treatment, however, should be selected according to the impurities in the beryllium filter cake.

One of the treatments, which is particularly suitable for use in combination with the double pH raising steps without the chelating treatment, comprises the steps of digesting the impure hydroxide in a strong alkali solution for a period sufficient to dissolve substantially all the beryllium values in the solution. After the insolubles are separated from the digesting solution, the beryllium solution is hydrolyzed to cause the precipitation of beryllium hydroxide. The precipitated beryllium hydroxide is then recovered from the solution.

Advantageously, the filter cake containing beryllium recovered from the double pH raising steps is digested in a 50% solution of sodium hydroxide. The temperature of the slurry, which tends to increase during digestion, advantageously is controlled by external cooling. The slurry is filtered, and the recovered filter cake is further treated with more 50% sodium hydroxide solution and refiltered. This second filtrate, after addition of solid sodium hydroxide to bring the concentration to 50%, is recycled and is used to make up part of the solution for digestion of the next batch of crude hydroxide precipitates. After the second NaOH treatment, the filter cake is repulped with deionized water and refiltered to recover the small amount of berryllium therein. The filtrate is used in the next subsequent step of the process to dilute the filtrate from the NaOH treatment. The new filter cake is discarded. A typical cake obtained at this stage analyzes substantially as follows (in percent by weight).

| | |
|---|---|
| BeO | 0.7 |
| Na | 35 |
| F | 25 |
| MgO | 7 |
| $Al_2O_3$ | 5 |
| CaO | 2 |
| Fe | 0.2 |
| $SO_4$ | 15 |
| Water of hydration | 10 |

The cake is composed chiefly of crystallized NaF and $NaF \cdot Na_2SO_4$, and is discarded.

As stated hereinabove, the first strong sodium hydroxide leach filtrate preferably is combined with the water repulp filtrate, and additional deionized water is added to bring the NaOH concentration to about 1.5 N. This diluted sodium hydroxide solution usually contains 4 to 5 g./l. BeO together with some aluminum and a very small amount of zinc (if the prior sulfide precipitation is not used or the step has not completely eliminated it). Because zinc and beryllium have a tendency to coprecipitate, the small mount of zinc must be eliminated before the final hydrolysis step if low zinc content in the final beryllium product is to be achieved. The zinc elimination step may be carried out by adding a solution of a sulfide such as 10% sodium sulfide solution to the dilute NaOH solution to cause the precipitation of ZnS. The zinc precipitae is filtered or otherwise separate by conventional methods and is discarded.

Subsequent to dilution and zinc removal, the solution in a suitable holding tank is brought to boiling by external heating for a period of time sufficient for all Na$_2$BeO$_2$ to hydrolyze to Be(OH)$_2$ which precipitates out of the solution while the aluminum remains therein. In the beryllium precipitation (deberyllization) step, boiling for two hours is generally adequate. The precipitate, which is readily filtered because it is granular in character, is subjected to a series of decantings, washings, and filterings as shown in the accompanying flow sheet to remove traces of impurities. Deionized water preferably is used to wash the settlings from the decantation tank afeer deberyllization as well as from the washer. The cake recovered may be dried to Be(OH)$_2$. The final product meets the following specification (percent):

| | |
|---|---|
| Zn | .015 |
| Pb | .010 |
| Mn | .003 |
| Fe | .010 |
| V | .009 |
| Al | .020 |
| Mg | .033 |
| Cu | .0014 |
| Si | 0.20 |
| Ca | .056 |
| Ti | .027 |
| Be(OH)$_2$ | 99.3 |

The Be(OH)$_2$ recovered may be fired at about 1600° F., or higher, to produce BeO. The overall recovery by this process is, in a typical pilot plant run on ore containing 1% BeO, approximately 75% of the assayed BeO in the ore.

The crude beryllium hydroxide recovered as the precipitate from the second pH raising step may be subjected to a number of other alternative treatments as shown in the flow sheet to produce the high purities required. Thus, in one preferred procedure identified in the flow sheet as Procedure A, the filter cake containing the impure beryllium hydroxide is added to a concentrated sulfuric acid (98%, H$_2$SO$_4$ or higher) in an amount sufficient or slightly in excess to convert stoichiometrically all the metals to sulfates (sulfate conversion). The conversion step is highly exothermic, and the heat of the reaction will cause continuous fuming at 300° F. to 600° F. until a semi-dry cake is obtained. The hydrogen fluoride as well as SO$_3$ generated from the conversion reaction may be recycled to the leaching solution to facilitate the dissolution of the beryllium in the leaching process described hereinabove.

The semi-dry sulfate cake is dissolved in water and the pH of the resultant solution is adjusted to about 7.0 and 8.0 by the addition of caustic therein. The pH raising step causes the precipitation of the hydroxide which is recovered by filtration. Optionally, the cake may be washed with water. After washing, the hydroxide cake is reslurried in a sufficient amount of water to prepare a relatively thin slurry (10% by weight of solids). The slurry of hydroxide is then added rapidly to concentrated sulfuric acid to produce boiling aggregates containing beryllium sulfate. Additional boiling for 30 minutes to an hour or even more may be used to insure the complete conversion of the hydroxide to the soluble sulfate. The fluorine in the slurry is volatilized to some extent, and silicon is mostly dehydrated. The impurities remaining in the form of insolubles are removed by filtration. The filter cake may be washed once or more to recover the soluble beryllium. After washing, the filter cake may be discarded. In these successive sulfuric acid treatments, the initial H$_2$SO$_4$ fuming step and the sulfuric acid boiling operation may be interchanged. When the fuming step is used in the second stage of the process, the semi-dry sulfate cake obtained is redissolved in water before it is subjected to further purification treatment.

In the next purification step, if chelating agent such as EDTA has not been used in an earlier process step, it is preferably added at this time to form soluble complexes with other impurities before the sulfate solution is subjected to a pH raising operation with a caustic to precipitate beryllium as a hydroxide. As described, EDTA may be recovered by acidifying the neutral or slightly alkaline solution to a pH of about 1.0 to 2.0 and followed by filtration to remove the precipitated EDTA which may be redissolved in an alkaline solution for subsequent use.

Alternatively, the dried or moistened beryllium hydroxide recovered from the double pH raising process is treated with a large excess amount of H$_2$SO$_4$ (preferably 98% or higher) to produce a slurry of insoluble sulfates (identified as Procedure B in the flow sheet). To insure complete conversion, the slurry is heated for about one hour or more at about 300° F. to below about 500° F. The substantially anhydrous sulfates thus formed together with dehydrated silica are removed by filtration. The filtrate may be recycled for treating another batch of impure beryllium hydroxide. The anhydrous sulfates are heated to volatilize the silicon and fluorine as SiF$_4$ and HF. The HF and SO$_3$ may be recovered for use in the leaching operation. Subsequent to the volatilization step, beryllium sulfate is dissolved in water and is precipitated in the form of hydroxide in a manner described hereinabove. EDTA or another chelating agent may also be used for the preparation of an extremely high purity product.

The alternative procedures of high concentration H$_2$SO$_4$ treatments in combination with the hydroxide precipitation of beryllium, particularly when it is carried out in the presence of a chelating agent, produce a product with an extremely low silica contamination and also meet low impurity requirements for all other contaminants.

For the process in which the initial pH raising step is carried out with milk of lime and in the presence of Na$^+$ and the subsequent pH raising step is conducted after the chelation treatment, the impurities in the resultant filter cake (beryllium hydroxide) may be sufficiently low that a simplified sulfuric acid treatment can be used (Procedure C). In the simplified treatment, the hydroxide cake is initially slurried with water. The slurry of hydroxide is then added rapidly to a concentrated sulfuric acid (98% H$_2$SO$_4$ or higher). The acid and water used advantageously are maintained in stoichiometric relations with the amount of Be(OH)$_2$ in the slurry for conversion of the latter to BeSO$_4$·4H$_2$O. The strong sulfate solution is diluted with water to a concentration preferably about 10 g./l. based on the weight of BeO. The diluted solution is then heated to a range of about 150° F. to just below boiling and preferably to about 170° F.

The impurities remaining in the form of insolubles are removed by filtration. The clear filtrate then is subjected to a pH raising operation as described hereinabove to precipitate the beryllium values. Since fluorine has been substantially removed in prior purification steps, the precipitation may be carried out at a lower pH value. We found a pH of about 7.2 to be suitable.

Precipitation of Be (OH)$_2$ from the sulfate solution with NH$_3$ results in a certain amount of (NH$_4$)$_2$SO$_4$ entrainment in the precipitates which preferably is washed out with either NH$_4$Cl or water. A small amount of sulfate, which may remain in the final product, is removed in the subsequent calcining operation for converting Be(OH)$_2$ to BeO. The resultant BeO is devoid of sulfate impurity.

Further to illustrate this invention, specific examples are described hereinbelow with further reference to the accompanying flow sheet.

EXAMPLE I

This example represents an average pilot plant run involving a 2-ton batch of ore. In this example, four thousand pounds of Spor-Topaz ore assaying 0.67% BeO is ground in a rodmill to minus 14 mesh. Water (usually wash water from a previous leach residue filtration) is added to the mill to make up a slurry of about 30% solids. The slurry is allowed to run to a steam-jacketed, 1000-gallon, lead-lined tank equipped with an agitator. Sulfuric acid is gradually added to the tank as needed to maintain a pH continually as close as feasible at about 1.4. The charge is heated to about 180°–200° F. and is held at this temperature for about 20 hours. About 900 pounds of acid is added.

After leaching is completed, ammonia gas is introduced to the leach solution slowly over a 4-hour period to bring the pH to about 3.8. The slurry is held at about 180° F. or above for a period of 5 hours. The slurry is subsequently filtered on a Moore filter and is washed thoroughly with a 0.1 M solution of ammonium sulfate to which sulfuric acid has been added to bring the pH to about 3.5. The used wash water is saved for slurrying another batch of ore. The filter cake contains 0.10% BeO, a loss of about 14% of the Be in the ore.

The filtrate is subjected to a second pH raising step wherein ammonia is again gradually introduced into it to bring the pH to about 8.5. During this operation, the temperature is held at 170° F. The slurry from this operation is filtered on a drum filter. The filtrate containing 0.013 grams per liter BeO is discarded resulting in a loss of 0.7% of the Be in the ore.

The hydroxide precipitate containing about 70% water is next mixed with 24 pounds of cold 50% NaOH solution per pound of BeO in the solution in a water-jacketed tank, and its temperature is kept as close as possible to room temperature. After digestion for at least one hour, the slurry is filtered in a plate and frame filter press. The recovered filter cake is repulped with a sufficient amount of 50% NaOH solution to make a pumpable slurry and then is refiltered on a drum filter. This filter cake is repulped with deionized water and filtered once more on a drum filter. The cake containing 0.7% BeO is discarded. This represents a loss of 4.3% of the Be in the ore.

To the filtrate, from the repulping with 50% NaOH, solid NaOH is added to bring the NaOH content up to about 50%, and this solution is reserved for use as part of the caustic for digesting the next batch of crude hydroxides.

The first strong caustic filtrate and the water repulp filtrate are combined with a sufficient amount of deionized water to make the specific gravity equivalent to a NaOH content of about 1.5 N. One liter of 10% $Na_2S$ solution is added, and after stirring for one-half hour, the solution is filtered in a plate and frame filter press. The cake, consisting substantially of zinc sulfide and $CaSO_4$, is discarded. The clear filtrate is boiled in a steam-jacketed tank for 2 hours. The precipitate of $Be(OH)_2$ is allowed to settle. The supernatant solution is decanted off, and the precipitate is washed twice with deionized water (filtered on a pan filter and washed once more on the filter). The filtrate and washings containing 0.73 pounds of BeO (2.7% of the Be in the ore) are discarded. The cake is dried and packaged. The dried product contains over 99% $Be(OH)_2$ and less than 150 parts per million of zinc.

EXAMPLE II

A quantity of ore approximately 2 tons in weight ground to pass 14 mesh is placed in an agitated, steam-jacketed, 1400-gallon tank along with sufficient water to make a slurry density of 1.260 to 1.270 which is equivalent to approximately 35% solids. As the ore is added to the aqueous phase (which is, in the examples, recycled wash water from a previous leatch) sulfuric acid is added at the rate of 6 gallons per hour holding the pH of the slurry adjusted at 1.4. During this operation, the temperature of the leach is raised to approximately 180° F. The temperature and the pH is maintained for 20 hours at which time the tank is drained and is fed to a filter. The resultant leach solution has the following composition:

Concentration in g./l.

| | |
|---|---|
| BeO | 2.31 |
| $Al_2O_3$ | 6.5 |
| MgO | 7.21 |
| Fe | .42 |
| Mn | .02 |
| Zn | .16 |
| F | 6.4 |

After filtration, the cake is washed with water acidified with sulfuric acid, to a pH of 1.4 and the cakes are then discarded.

The filtrate is returned to a tank similar to the leach tank and heated to about 190° F. The pH is raised to 4.0 to allow an increase in fluoride ion activity and the majority of the aluminum is precipitated as aluminum hydroxyfluoride. After precipitation for 4 to 6 hours at 190° F., the solution has the following composition:

Concentrations in g./l.

| | |
|---|---|
| BeO | 2.18 |
| $Al_2O_3$ | .36 |
| MgO | 2.64 |
| Fe | .01 |
| Mn | .02 |
| Zn | .16 |
| F | .25 |

The solids consist principally of aluminum hydroxyfluoride plus lesser amounts of a magnesium compound, the nature of which is obscure, and a basic salt of iron. In addition, a small amount of an unknown beryllium compound is also present.

The precipitated slurry is thickened and then passed through a drum filter while the overflow goes directly to the clarification press along with the filtrate from the drum filter.

The clarified filtrate is then heated to 170° F. in stainless steel overflowing tanks, and the pH raised in successive tanks to 7.5 and 8.1 with $NH_3$. It then flows to a filter where the precipitated materials are separated. A typical filtrate from a leach carried out at pH 1.4 has the following composition in grams per liter:

| | |
|---|---|
| BeO | .01 |
| $Al_2O_3$ | .001 |
| MgO | 1.5 |
| Fe | N.F. |
| Mn | 0.1 |
| Zn | .003 |
| F | .01 |

The filter cake, if dried, has the following in percent:

| | |
|---|---|
| BeO | 16.0 |
| $Al_2O_3$ | 2.6 |
| MgO | 9.70 |
| Fe | .07 |
| Mn | .07 |
| Zn | .007 |
| F | 1.8 |

The cake is, however, not dried but is treated wet with 50% NaOH solution which dissolves substantially all the beryllium. This digestion is done in water-cooled, stainless steel tanks to carry away the heat of dilution and of reaction. It normally takes about 2 hours. During this digestion, $Na_2O_2$ is added to cause the precipitation of manganese although it may be added later. The caustic digestate is then filtered. The cake, after advancing repulps with NaOH solutions, is discarded, and the filtrate is sent to dilution. At this point, the filtrate, typically, will have the following composition in grams per liter:

| | |
|---|---|
| BeO | 40 |
| $Al_2O_3$ | 3.2 |
| MgO | N.F. |
| Fe | N.F. |
| Mn | .01 |
| Zn | .01 |
| F | 2.2 |

The filter cake contains the following in percent:

| | |
|---|---|
| BeO | 1.5 |
| $Al_2O_3$ | 2.4 |
| MgO | 18.2 |
| Fe | .13 |
| Mn | .11 |
| Zn | .01 |
| F | 1.7 |

It is discarded.

The filtrate is diluted to a specific gravity equivalent to 60 g./l. NaOH. A 10% $Na_2S$ solution is added in an amount equivalent to 0.5 g./l. S—to precipitate zinc as sulfide the solution is then filtered, and the clear filtrate solution is boiled for 2 hours in stainless steel tanks, and the precipitate recovered by decanting and filtering. The precipitate is washed with deionized water several times before being dried to substantially pure $Be(OH)_2$ which meets the following impurity specification in parts per million:

| | |
|---|---|
| Al | <450 |
| Ca | <1250 |
| Cr | <7 |
| Cu | <10 |
| Fe | <400 |
| Mg | <325 |
| Mn | <80 |
| Pb | <50 |
| Si | <1700 |
| Zn | <150 |
| Ni | <15 |
| Ag | <3 |
| Na | <1000 |

No other impurities are detectable by arc emission spectography.

We claim:

1. A process for recovering substantially pure beryllium hydroxide from impure beryllium hydroxide containing fluorine, aluminum, magnesium, zinc and other heavy metal impurities which comprises digesting the impure beryllium hydroxide in an alkali solution for a period sufficient to dissolve substantially all the beryllium therein, adding a soluble sulfide to the resulting solution, separating the insolubles including precipitated sulfides from the solution, hydrolyzing the beryllium-containing solution to cause precipiation of beryllium hydroxide, and recover the precipitate.

2. A process according to claim 1 wherein the alkali is sodium hydroxide and the solution thereof is diluted to about 1.5 N prior to adding the soluble sulfide and hydrolyzing.

References Cited

UNITED STATES PATENTS 2,974,011  3/1961  Riabovol _____ 23—183

FOREIGN PATENTS 926,392  5/1963  Great Britain _____ 23—24 B

HERBERT T. CARTER, Primary Examiner

U.S. Cl. X.R.

423—102